US008365036B2

(12) United States Patent  (10) Patent No.: US 8,365,036 B2
Ramaraju et al.  (45) Date of Patent: Jan. 29, 2013

(54) SOFT ERROR CORRECTION IN A MEMORY ARRAY AND METHOD THEREOF

(75) Inventors: Ravindraraj Ramaraju, Round Rock, TX (US); David R. Bearden, Austin, TX (US); Troy L. Cooper, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 606 days.

(21) Appl. No.: 12/560,999

(22) Filed: Sep. 16, 2009

(65) Prior Publication Data

US 2011/0066918 A1    Mar. 17, 2011

(51) Int. Cl.
*H03M 13/00* (2006.01)
*G06F 11/00* (2006.01)

(52) U.S. Cl. .......................... 714/757; 714/746

(58) Field of Classification Search .................. 714/756, 714/764, 746, 758, 777, 785, 800, 799, 718, 714/757; 365/201, 185.33
See application file for complete search history.

(56) References Cited

U.S. PATENT DOCUMENTS

| | | | |
|---|---|---|---|
| 3,745,525 A | 7/1973 | Hong et al. | |
| 3,766,521 A | 10/1973 | Carter et al. | |
| 4,493,081 A * | 1/1985 | Schmidt | 714/754 |
| 4,849,975 A | 7/1989 | Patel | |
| 6,604,222 B1 | 8/2003 | Jensen | |
| 7,134,069 B1 * | 11/2006 | Longwell et al. | 714/800 |
| 7,228,485 B1 | 6/2007 | Wu et al. | |
| 7,529,992 B1 | 5/2009 | Teig et al. | |
| 7,644,348 B2 * | 1/2010 | Longwell et al. | 714/800 |
| 2007/0214403 A1 * | 9/2007 | Longwell et al. | 714/800 |
| 2010/0083065 A1 * | 4/2010 | Longwell et al. | 714/746 |

OTHER PUBLICATIONS

Wu, Zi-Ning et al; "Interleaved Parity Check Codes and Reduced Complexity Detection"; IEEE International Conference on Communications; 1999; pp. 1648-1652; vol. 3, Jun. 1999; IEEE.
Bossen, D. C.; "b-Adjacent Error Correction"; IBM Journal of Research and Development; 1970; pp. 402-408; vol. 14, No. 4; IBM.
Patel, A. M. et al.; "Optimal Rectangular Code for High Density Magnetic Tapes"; IBM Journal of Research and Development; Nov. 1974; pp. 579-588; vol. 18, No. 6; IBM.
Patel, Arvind M.; "Error Recovery Scheme for the IBM 3850 Mass Storage System"; IBM Journal of Research and Development; 1980; pp. 32-42; vol. 24, No. 1; IBM.
Chen, C.L. et al.; "Error-Correcting Codes for Semiconductor Memory Applications: A State-of-the-Art-Review"; IBM Journal of Research and Development; Mar. 1984; pp. 124-134; vol. 28, No. 2; IBM.
Chang, et al., "An 8T-SRAM for Variability Tolerance and Low-Voltage Operation in High-Performance Caches", IEEE Journal of Solid-State Circuits, vol. 43, No. 4, Apr. 2008.
Nicolaidis, "Design for Soft Error Mitigation", IEEE Transactions on Device and Materials Reliability, vol. 5, No. 3, Sep. 2005.

(Continued)

*Primary Examiner* — Phung M Chung
(74) *Attorney, Agent, or Firm* — David G. Dolezal

(57) ABSTRACT

A memory system includes a memory array. The memory array includes a plurality of storage locations arranged in rows and columns. The memory system includes error correction circuitry that generates correct data bits from data bits of the memory array and error correction bits. The data bits received by the error correction circuitry are divided in subgroups where each subgroup of data bits is used to generate a subgroup of the correct data bits. The subgroups of data bits are stored in a row of the memory array at locations that are interleaved with each other.

21 Claims, 5 Drawing Sheets

OTHER PUBLICATIONS

De, et al., "RSYN: A System for Automated Synthesis of Reliable Multilevel Circuits", IEEE Transactions on Very Large Scale Integration (VLSI) Systems, vol. 2, No. 2, Jun. 1994.

Dutta, et al., Multiple Bit Upset Tolerant Memory Using a Selective Cycle Avoidance Based SEC-DED-DAEC Code, IEEE, 25th VLSI Test Symmposium [sic], 2007.

Gill, et al., "Radiation Induced Single-word Multiple-bit Upsets Correction in SRAM", IEEE, Proceedings of the 11th International On-Line Testing Symposium, 2005.

"ISSCC T5: Error-Correcting Codes for Memories", Instructor Takayuki Kawahara, University of Pennsylvania, Feb. 11, 2007.

Dutta, A., et al., "Multiple Bit Upset Tolerant Memory Using a Selective Cycle Avoidance Based SEC-DED-DAEC Code", 25th IEEE VLSI Test Symmposium (VTS '07), 2007.

Bossen, D.C., et al., "A System Solution to the Memory Soft Error Problem", IBM J. Res. Develop., vol. 24, No. 3, May 1980, pp. 390-397.

* cited by examiner

ERROR CORRECTION ENCODER

$x_8 = u_0 \oplus u_2 \oplus u_3 \oplus u_5 \oplus u_6$
$x_9 = u_0 \oplus u_1 \oplus u_3 \oplus u_6 \oplus u_7$
$x_{10} = u_0 \oplus u_1 \oplus u_2 \oplus u_4 \oplus u_7$
$x_{11} = u_1 \oplus u_2 \oplus u_3 \oplus u_4 \oplus u_5$
$x_{12} = u_4 \oplus u_5 \oplus u_6 \oplus u_7$

FIG. 4

SYNDROME GENERATOR 46

$s_0 = u_0 \oplus u_2 \oplus u_3 \oplus u_5 \oplus u_6 \oplus x_8$
$s_1 = u_0 \oplus u_1 \oplus u_3 \oplus u_6 \oplus u_7 \oplus x_9$
$s_2 = u_0 \oplus u_1 \oplus u_2 \oplus u_4 \oplus u_7 \oplus x_{10}$
$s_3 = u_1 \oplus u_2 \oplus u_3 \oplus u_4 \oplus u_5 \oplus x_{11}$
$s_4 = u_4 \oplus u_5 \oplus u_6 \oplus u_7 \oplus x_{12}$

FIG. 6

| | $u_0$ | $u_1$ | $u_2$ | $u_3$ | $u_4$ | $u_5$ | $u_6$ | $u_7$ |
|---|---|---|---|---|---|---|---|---|
| SUBGROUP 0 = | {$D_0$ | $D_4$ | $D_8$ | $D_{12}$ | $D_{16}$ | $D_{20}$ | $D_{24}$ | $D_{28}$} |
| SUBGROUP 1 = | {$D_1$ | $D_5$ | $D_9$ | $D_{13}$ | $D_{17}$ | $D_{21}$ | $D_{25}$ | $D_{29}$} |
| SUBGROUP 2 = | {$D_2$ | $D_6$ | $D_{10}$ | $D_{14}$ | $D_{18}$ | $D_{22}$ | $D_{26}$ | $D_{30}$} |
| SUBGROUP 3 = | {$D_3$ | $D_7$ | $D_{11}$ | $D_{15}$ | $D_{19}$ | $D_{23}$ | $D_{27}$ | $D_{31}$} |

FIG. 3

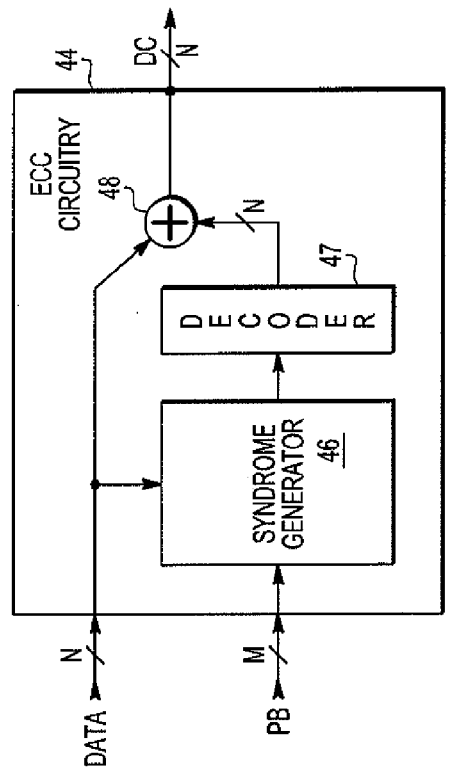

FIG. 5

SOFT ERROR CORRECTION IN A MEMORY ARRAY AND METHOD THEREOF

BACKGROUND

1. Field

This disclosure relates generally to semiconductors, and more specifically, to error correction circuits used in semiconductor memories.

2. Related Art

Semiconductors, such as memories, are susceptible to a well documented problem known as soft errors. Soft errors are caused by radiation sources such as alpha particles, high energy neutrons and gamma particles, for example. These radiation sources impart sufficient energy to bit cells of memories to cause the programmed value of the bit cells to change. The area of impact from these radiation sources is not believed to have changed significantly over the past several decades. However, during that time the size of electronic circuitry implemented within semiconductors has dramatically reduced. As a result, dimensions of a semiconductor bit cell have dramatically been reduced. Therefore, the total number of adjacent memory bits which can fail from a single alpha particle impact or other single upset event is significant. Others have used error correction techniques to address this problem. However, to correct for multiple-bit errors, complex coding schemes are required as a linear coding scheme will not correct multiple-bit errors. Such complex coding schemes are complex and require additional time and power and thus are disadvantageous.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 illustrates in diagrammatic form a grouping of data bits associated with subgroups of data bits;

FIG. 4 illustrates one form of an encoding scheme associated with the present invention;

FIG. 5 illustrates in partial schematic form one form of the ECC circuitry of FIG. 2;

FIG. 6 illustrates in diagrammatic form logic equations associated with generation of syndrome bits by a syndrome generator within the ECC circuitry of FIG. 5;

DETAILED DESCRIPTION

Figure 1:
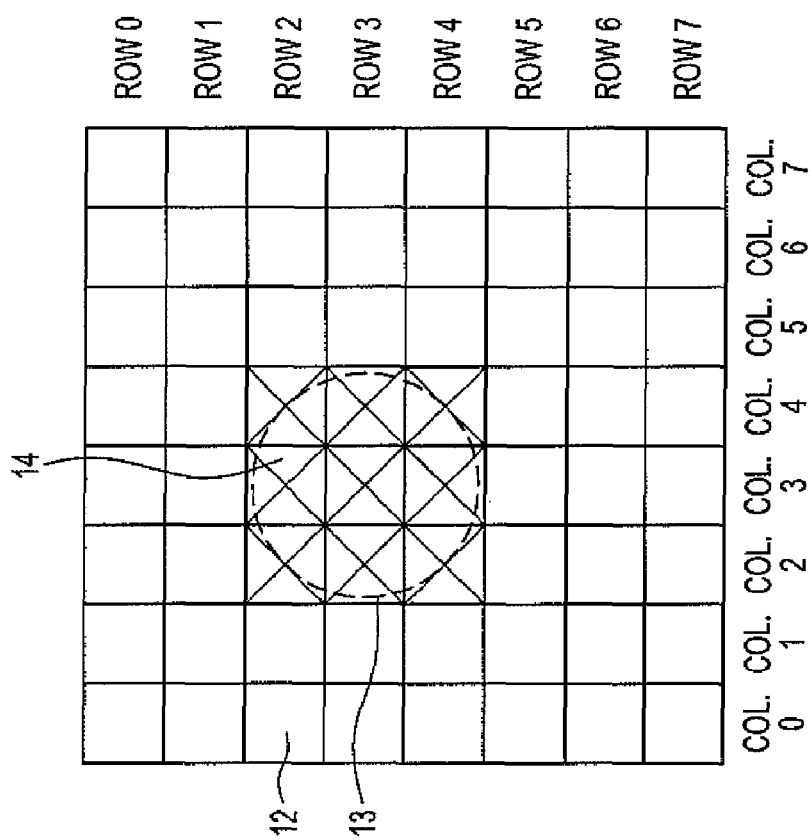
FIG. 1 illustrates in perspective form a memory array that is subjected to a soft error from either an alpha particle or a high energy neutron.

Illustrated in FIG. 1 is a diagram of a semiconductor memory array 10 having a plurality of memory bits that are arranged in rows and columns. In the illustrated form there are eight rows, labeled "Row 0" through "Row 7", and eight columns, labeled "Col 0" through "Col 7". A representative memory bit is memory bit 12. Assume that an energy particle impacts the memory array 10 with an impact region that is illustrated by a spherical impact region 13. Because the alpha particle carries a high energy, the region that is within the radius covers multiple adjacent bit cells. Thus each impacted bit cell from the spherical impact region 13 has an "X" illustrated on the bit cell. For example, one of the impacted bit cells is bit cell 14. If data is stored in Row 2 and the error correcting scheme that is employed only permits correction of one or two bits in a data word, the illustrated energy particle impact has defeated the error correction circuitry. To provide error correction circuitry that is capable of correcting three or more bits in a data word, significant time and power is required to implement a coding scheme with the required capability.

Figure 2:
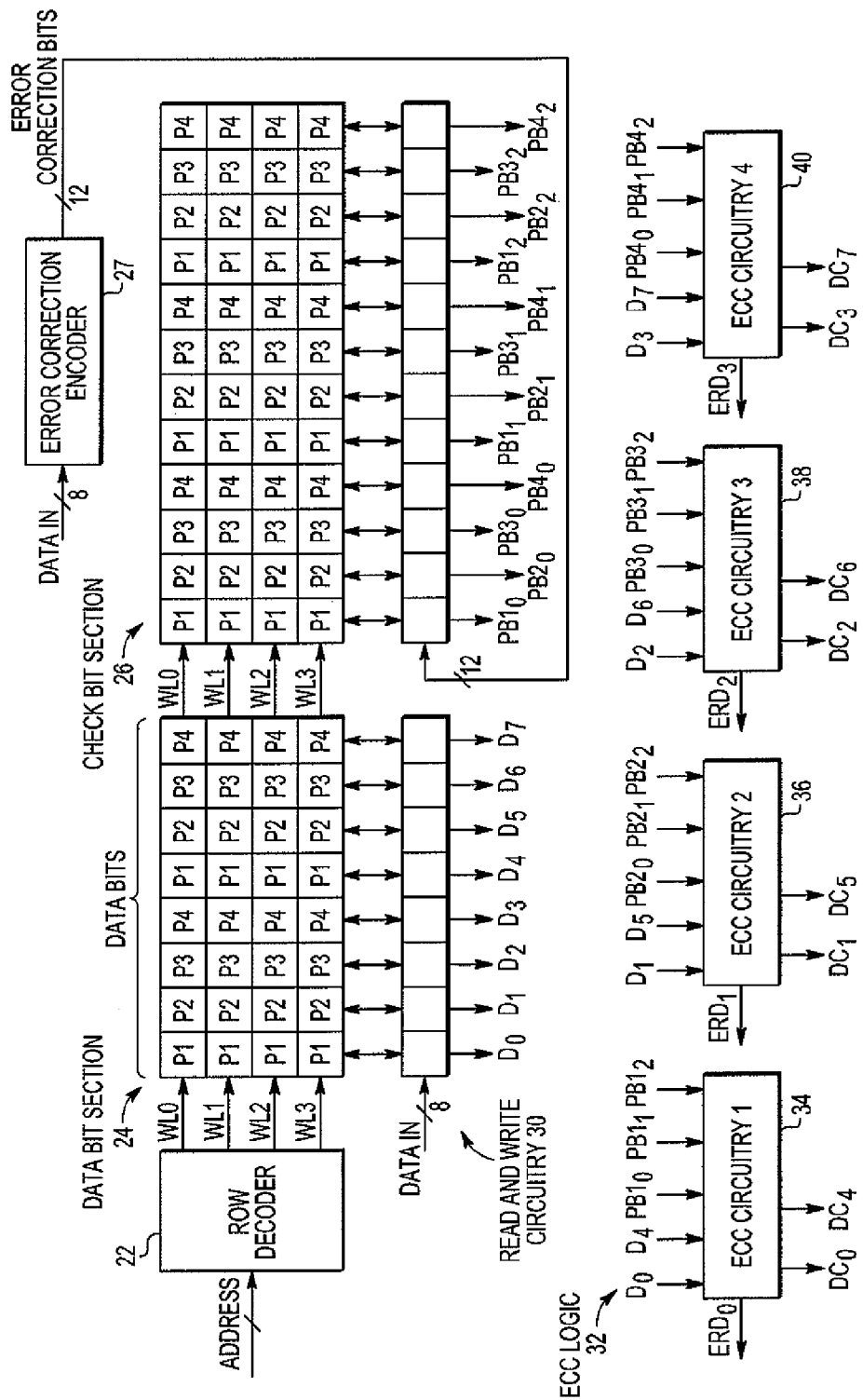
FIG. 2 illustrates in a block diagram form one embodiment of an error detection and correction circuit in accordance with the present invention.

Illustrated in FIG. 2 is a memory system 20 generally having a row decoder 22, a data bit section 24, a check bit section 26, an error correction encoder 27, read and write circuitry 30 and ECC (Error Checking and Correction) circuitry in the form of ECC circuitry 34, ECC circuitry 36, ECC circuitry 38 and ECC circuitry 40. The data bit section 24 and the check bit section 26 form a memory array having rows and columns of memory bits. It should be understood that any of various known memory bit cells may be implemented within the data bit section 24 and the check bit section 26. The data bit section 24 is an array that stores data bits and the check bit section 26 is an array that stores check bits. In one form, each row or word line of the data bit section 24 and the check bit section 26 is contiguous with memory cells. The row decoder 22 has an input for receiving a memory address for implementing a memory access. The row decoder 22 has a plurality of outputs, each connected to a predetermined word line for accessing a predetermined one of the word lines. The length of each wordline of the data bit section 24 is implementation specific and may vary from embodiment to embodiment. For convenience of illustration, eight data bits per wordline are illustrated. For eight data bits per wordline, a total of twelve check bits or parity bits are required. The terms "parity bits", "error correction bits" and "check bits" are used interchangeably herein. Other wordline data lengths, such as sixteen, thirty-two and sixty-four bits, etc. may be implemented. The number of parity bits per wordline will vary depending upon the number of data bits that are implemented in a wordline. Within each memory cell of the data bit section 24, a label of "P1", "P2", "P3" or "P4" is provided. The data bits are divided into subgroups so that two data bits are in each subgroup. Additionally, at least four memory cells separate each memory cell of a same subgroup in a single wordline. This is an intentional spacing as a sufficient spacing between the two memory cells of wordline WL01 of parity subgroup P1 is chosen so that a single alpha particle event will not corrupt both data bits of the same parity subgroup in that wordline. The bit cells of each wordline have the same parity subgroup assignment. Within each memory cell of the check bit section 26, a corresponding label of "P1", "P2", "P3" or "P4" is also provided. Each parity bit within the check bit section 26 is assigned to one of these subgroups.

Individual bit input/output terminals of each of data bit section 24 and check bit section 26 are coupled to respective input/output terminals of the read and write circuitry 30. The data bits and parity bits of each wordline may be read from the memory array and into the read and write circuitry 30. Similarly, data bits and parity bits may be written to any wordline of the data bit section 24 and check bit section 26. In one form the read portion of the read and write circuitry 30 may be implemented with sense amplifiers. A data portion of the read and write circuitry 30 has a data input for receiving input data labeled "Data In", and a parity bit portion of the read and write circuitry 30 has an input for receiving error correction bits generated by the error correction encoder 27. An output of the data portion of the read and write circuitry 30 provides the addressed data bits labeled D0 through D7. An output of the parity bit portion of the read and write circuitry 30 provides parity bits respectively labeled $PB1_0$, $PB2_0$, $PB3_0$, $PB4_0$, $PB1_1$, $PB2_1$, $PB3_1$, $PB4_1$, $PB1_2$, $PB2_2$, $BP3_2$ and $PB4_2$ where the nomenclature for the parity bits is the first number represents the subgroup of the parity bit and the second number which is subscripted represents the particular parity bit (e.g. first (0), second (1) or third (2)) for the subgroup. The data bits and parity bits that are provided by the read and write circuitry 30 are connected to specific inputs of the ECC logic 32 in accordance with a predetermined coding scheme to be further described in subsequent drawings. ECC circuitry 34 has inputs associated with the first subgroups of data bits and parity bits. ECC circuitry 36 has inputs associated with the second subgroup of data bits and parity bits. ECC circuitry 38 has inputs associated with the third subgroup of data bits and parity bits, and ECC circuitry 40 has inputs associated with the fourth subgroup of data bits and parity bits. A first input of ECC circuitry 34 receives data bit D0 and a second input of ECC circuitry 34 receives data bit D4. A third input of ECC circuitry 34 receives parity bit $PB1_0$, a fourth input of ECC circuitry 34 receives parity bit $PB1_1$, and a fifth input of ECC circuitry 34 receives parity bit $PB1_2$. A first data output of ECC circuitry 34 provides a first correct data bit $DC_0$. A second data output of ECC circuitry 34 provides a second correct data bit $DC_4$. An error indicator output of ECC circuitry 34 provides an error signal $ERD_0$. A first input of ECC circuitry 36 receives data bit D1 and a second input of ECC circuitry 36 receives data bit D5. A third input of ECC circuitry 36 receives parity bit $PB2_0$, a fourth input of ECC circuitry 36 receives parity bit $PB2_1$, and a fifth input of ECC circuitry 36 receives parity bit $PB2_2$. A first data output of ECC circuitry 36 provides a first correct data bit $DC_1$. A second data output of ECC circuitry 36 provides a second correct data bit $DC_5$. An error indicator output of ECC circuitry 36 provides an error signal $ERD_1$. A first input of ECC circuitry 38 receives data bit D2 and a second input of ECC circuitry 38 receives data bit D6. A third input of ECC circuitry 38 receives parity bit $PB3_0$, a fourth input of ECC circuitry 38 receives parity bit $PB3_1$, and a fifth input of ECC circuitry 38 receives parity bit $PB3_2$. A first data output of ECC circuitry 38 provides a first correct data bit $DC_2$. A second data output of ECC circuitry 38 provides a second correct data bit $DC_6$. An error indicator output of ECC circuitry 38 provides an error signal $ERD_2$. A first input of ECC circuitry 40 receives data bit D3 and a second input of ECC circuitry 40 receives data bit D7. A third input of ECC circuitry 40 receives parity bit $PB4_0$, a fourth input of ECC circuitry 40 receives parity bit $PB4_1$, and a fifth input of ECC circuitry 40 receives parity bit $PB4_2$. A first data output of ECC circuitry 40 provides a first correct data bit $DC_3$. A second data output of ECC circuitry 40 provides a second correct data bit $DC_7$. An error indicator output of ECC circuitry 40 provides an error signal $ERD_3$.

In operation, a memory address is provided to the row decoder 22 to address a memory location using a word line that is contiguous within the data bit section 24 and the parity or check bit section 26 of the memory array. This address operation may be associated with either a read or a write operation. The row decoder 22 functions to decode the memory address and assert an appropriate enable signal to one of the designated word lines WL0, WL1, WL2 or WL3. In response to an asserted word line enable, control logic of the read and write circuitry 30 functions to transfer the data bits and parity bits to the read and write circuitry 30. The read and write circuitry 30 provides data bits $D_0$ through $D_7$ and associated parity bits to ECC circuitry 34, ECC circuitry 36, ECC circuitry 38 and ECC circuitry 40.

The data bits stored in the data bit section 24 are stored exactly as presented for storage. In other words, no encoding to another format occurs. In parallel, the data bits are applied to the error correction encoder 27 which outputs a number of check bits which are error correction bits which are to accompany the data at readout. In the illustrated form there are eight bits of data partitioned in four partitions or subgroups (P1 through P4). The error correction encoder 27 takes the data, for each partition or subgroup, encodes and outputs check bits or error correction bits. Logically, each subgroup or partition is encoded. The error correction encoder 27 operates on each partition or subgroup in parallel. In the illustrated form of FIG. 2 having four subgroups and eight data bits per wordline, for each two data bits there are three check bits created. Other implementations will vary with differing bit sizes.

When a row of data bits is read out from the read and write circuitry 30, there are logical partitions of the data and check bits which are put into the ECC circuitry. Details of one form of the ECC circuitry will be provided below in FIG. 5. The ECC circuitry functions to internally generate syndrome bits for each group of data bits and associated parity bits. The syndrome bits are used to identify and correct any data bits that have been corrupted by using a conventional linear code. One example of a linear code is the conventional Hamming code.

Illustrated in FIG. 3 is a diagram which further illustrates error correction of data in a memory array. For better understanding, the size of each wordline of data will now be assumed to be thirty-two bits rather than the eight bits illustrated in FIG. 2. In FIG. 3 the thirty-two data bits of a single row or wordline are represented as data bits $D_0$ through $D_{31}$, respectively. The data bits are physically placed into a row of a memory array in that sequential order. However, for error correction purposes the organization of all of the data bits in the wordline are grouped differently which will permit multiple bit error correction using a linear correction algorithm, such as a Hamming code rather than a more complex (i.e. more expense and more power and slower operation) polynomial correction code. It should be apparent that other data bit lengths may be implemented. The thirty-two data bits are divided into four subgroups (labeled 0, 1, 2 and 3) that each have eight "universal" bit positions, respectively labeled $U_0$, $U_1$, $U_2$, $U_3$, $U_4$, $U_5$, $U_6$ and $U_7$. Illustrated in FIG. 3 is the specific assignment of each data bit to a subgroup and to a specific universal bit position. For purposes of creating parity or error correction bits, the thirty-two data bits are assigned sequentially in a column to the first universal data bit position $U_0$ and then interleaves or wraps back to the same order of subgroup assignments (subgroups 0, 1, 2 and 3) in the $U_1$ bit position column representing the second universal data bit position. The assignment of data bits occurs through the $U_1$ bit position column and interleaves or wraps to the top of a column for the universal data bit position $U_2$. The assignment of data bits occurs in this methodology for the remainder of columns representing data bit positions $U_3$, $U_4$, $U_5$, $U_6$ and $U_7$. As a result, the first subgroup 0 of data bits contains the data bits $D_0$, $D_4$, $D_8$, $D_{12}$, $D_{16}$, $D_{20}$, $D_{24}$ and $D_{28}$. Similarly, the second subgroup 1 contains the data bits $D_1$, $D_5$, $D_9$, $D_{13}$, $D_{17}$, $D_{21}$, $D_{25}$ and $D_{29}$. The third subgroup 2 contains the data bits $D_2$, $D_6$, $D_{10}$, $D_{14}$, $D_{18}$, $D_{22}$, $D_{26}$ and $D_{30}$. The fourth subgroup 3 contains the data bits $D_3$, $D_7$, $D_{11}$, $D_{15}$, $D_{19}$, $D_{23}$, $D_{27}$ and $D_{31}$.

As used herein the term 'interleave' refers to the fact that there is a data bit of a second subgroup of data bits that is located between two consecutive data bits of a first subgroup of data bits. Similarly, there is a data bits of the first subgroup of data bits that is located between two consecutive data bits of the second subgroup of data bits. With these assignments of data bit positions, should an alpha particle event disturb any three consecutive bit positions within the data bit array, correction of all three consecutive bit positions may be made using a single bit or linear correction technique as opposed to having to implement a polynomial correction technique.

The use of a single bit error correction method significantly simplifies the circuitry, the power and the time required for corrections as contrasted with using a polynomial correction algorithm. Examples of polynomial correction algorithms include the Reed-Solomon correction method. Note that the data bits $D_0$, $D_1$ and $D_2$, for example, are in adjacent bit positions in the first word line WL0 of data bit section 24. All of these bits may potentially be disturbed and made erroneous as a result of an alpha particle event. However, multiple bit errors do not exist within a same subgroup as these three bits exist within the respective subgroups 0, 1 and 2. Thus the error correction bit generation is performed separately by subgroup and a single bit correction may be implemented with a linear correction technique.

Illustrated in FIG. 4 is an example encoding of the thirty-two bit wordline example which details the encoding operations which are performed by an error correction encoder such as the error correction encoder 27 of FIG. 2. Five parity or error correction bits labeled $X_8$, $X_9$, $X_{10}$, $X_{11}$ and $X_{12}$ are created for each respective subgroup using the respective logic equations of FIG. 4. These logic equations are defined by the conventional Hamming code. Other linear codes are implemented with differing logic equations. The logic equations are also dependent upon the data bit size implementation. Thus a total of twenty parity bits are generated for a thirty-two bit data word. In other words, each subgroup will have generated parity bits $X_8$, $X_9$, $X_{10}$, $X_{11}$ and $X_{12}$. For example, for subgroup 0, the parity bit $X_8$ is generated by the Exclusive ORing of data bits $D_0$, $D_8$, $D_{12}$, $D_{20}$ and $D_{24}$. For subgroup 0, the parity bit $X_9$ is generated by the Exclusive ORing of data bits $D_0$, $D_4$, $D_{12}$, $D_{24}$ and $D_{28}$. In contrast, for subgroup 1, the parity bit X8 is generated by the Exclusive ORing of data bits $D_1$, $D_9$, $D_{13}$, $D_{21}$ and $D_{25}$. For subgroup 1, the parity bit $X_9$ is generated by the Exclusive ORing of data bits $D_1$, $D_5$, $D_{13}$, $D_{25}$ and $D_{29}$. In this manner the error correction encoder 27 is able to generate twenty parity bits for a thirty-two bit wordline. In the FIG. 2 embodiment of a wordline with 8 data bits, a total of twelve error correction bits are generated using logic equations defined by any well-known linear correction code, such as the Hamming code.

Illustrated in FIG. 5 is ECC circuitry 44 which is an exemplary embodiment analogous to one of the multiple ECC circuitry illustrated in FIG. 2. ECC circuitry 44 corresponds to the error checking and correction circuit for one subgroup. Since four subgroups are contemplated, there are four ECC circuits in FIG. 2 as embodied by ECC circuitry 34, ECC circuitry 36, ECC circuitry 38 and ECC circuitry 40. A data terminal is provided for receiving N data bits. In the illustrated implementation of FIGS. 3 and 4 where each wordline is thirty-two bits and there are four subgroups, N has a value of eight. The data terminal is connected to a data input of a syndrome generator 46 and to a first input of an N-bit wide Exclusive OR circuit 48. A parity bit terminal is provided for receiving M parity bits. In the illustrated implementation of FIGS. 3 and 4 where each wordline is thirty-two bits and there are four subgroups, M has a value of five. The parity bit terminal is connected to a parity bit input of the syndrome generator 46. An output of the syndrome generator 46 is connected to an input of a decoder 47. The decoder 47 is a conventional Hamming code decoder for generating syndrome bits and will not be further detailed. An output of the decoder 47 provides N syndrome bits and is connected to a second input of the Exclusive OR circuit 48. An output of Exclusive OR circuit 48 provides a total of N correct data bits, each labeled DC.

To further understand ECC circuitry 44, refer to FIG. 6 which details the logic equations associated with the syndrome generator 46. Each subgroup generates concurrently a set of syndrome bits. In the thirty-two data bits and twenty parity bits example assumed in FIGS. 3 and 4, there are five parity bits in each of four subgroups representing the value M in FIG. 5. Therefore, FIG. 6 is illustrated as generating five syndrome bits, $S_0$, $S_1$, $S_2$, $S_3$ and $S_4$. The syndrome bit $S_0$ for the first subgroup 0 is represented as the exclusive ORing of the universal data bits for $U_0$, $U_2$, $U_3$, $U_5$ and $U_6$ which are exclusive ORed with the parity bit $X_8$ of FIG. 4. It should be noted that the parity bit $X_8$ and other parity bits of FIG. 4 are universal to or common for all the subgroups of FIG. 3. For the subgroup 0 the data bits $D_0$, $D_8$, $D_{12}$, $D_{20}$ and $D_{24}$ are exclusive ORed and then exclusive ORed with parity or error correction bit $X_8$. For the second subgroup 1, the syndrome bit $S_0$ is represented as the exclusive ORing of the universal data bits for $U_0$, $U_2$, $U_3$, $U_5$ and $U_6$ which are exclusive ORed with the parity bit $X_8$. In other words, for the subgroup 1 the data bits $D_1$, $D_9$, $D_{13}$, $D_{21}$ and $D_{25}$ are exclusive ORed, and then exclusive ORed with parity or error correction bit X8. For the third subgroup 2, the syndrome bit $S_0$ is represented as the exclusive ORing of the universal data bits for $U_0$, $U_2$, $U_3$, $U_5$ and $U_6$ which are exclusive ORed with the parity bit $X_8$. In other words, for the subgroup 2 the data bits $D_2$, $D_{10}$, $D_{14}$, $D_{22}$ and $D_{26}$ are exclusive ORed, and then exclusive ORed with parity or error correction bit $X_8$. For the fourth subgroup 3, the syndrome bit $S_0$ is represented as the exclusive ORing of the universal data bits for $U_0$, $U_2$, $U_3$, $U_5$ and $U_6$ which are exclusive ORed with the parity bit $X_8$. In other words, for the subgroup 3 the data bits $D_3$, $D_{11}$, $D_{15}$, $D_{23}$ and $D_{27}$ are exclusive ORed, and then exclusive ORed with parity or error correction bit $X_8$. Generation of the syndrome bits $S_1$, $S_2$, $S_3$ and $S_4$ follows the logic equations of FIG. 6 in a similar manner. The five generated syndrome bits are provided to the decoder 47 which converts the syndrome bits into eight corresponding bits pursuant to the particular linear code being implemented. When a Hamming code is implemented, the decoder 47 functions to modify the syndrome bits into equivalent N data bits pursuant to conventional decoding equations. The N data bits for each subgroup are exclusive ORed with the N decoded error correction bits from decoder 47, respectively. Each subgroup thus generates N correct bits labeled DC. For thirty-two bits of data, the value of N is eight and the value of M is five. For eight bits of data, the value of N is two and the value of M is three. For sixty-four bits of data, the value of N is sixteen and the value of M is six.

Figure 7:
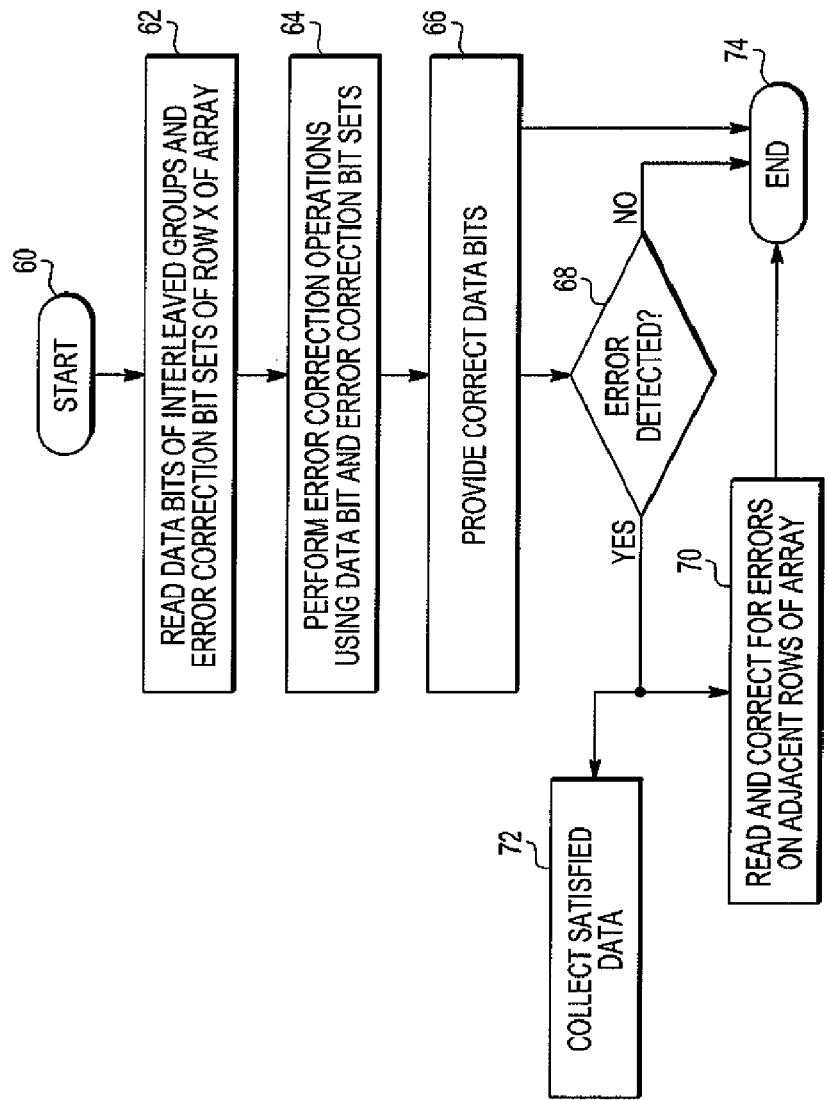
FIG. 7 in flow chart form a method of error checking in accordance with the present invention.

Illustrated in FIG. 7 is a flowchart illustrating a method of error correction from an SER (soft error rate) error event. After a command or a signal is provided to generate a start step 60, data bits of interleaved groups of data from a row X of a memory array are read. Concurrently, error correction bit sets of the row X of the memory array are read. In a step 64, if an error has been detected, a series of error correction operations are performed using the data bits and error correction bit sets. In a step 66, correct data bits are provided. After step 66 in one form an end step 74 is performed. In another form a step 68 is performed wherein a determination is made whether a bit error was actually detected in connection with the performance of step 64. If a bit error had not occurred, then the end step 74 is performed. If a bit error had occurred, a step 70 is implemented wherein adjacent rows and columns to the data bit determined to have a bit error are read. Error correction is performed for the bits in these rows and columns. In one form only the immediately adjacent rows and columns are read. In other forms two or more immediately adjacent rows and columns in each direction (i.e. top, bottom, left and right) are read and error correction performed thereon. After the adjacent rows and columns to the detected erroneous data bit have been read and corrected, the end step 74 is performed. Additionally, in a step 72 statistical data on the number and location of data bit errors is collected. Such statistical data may be used for various analytical purposes.

Figure 8:
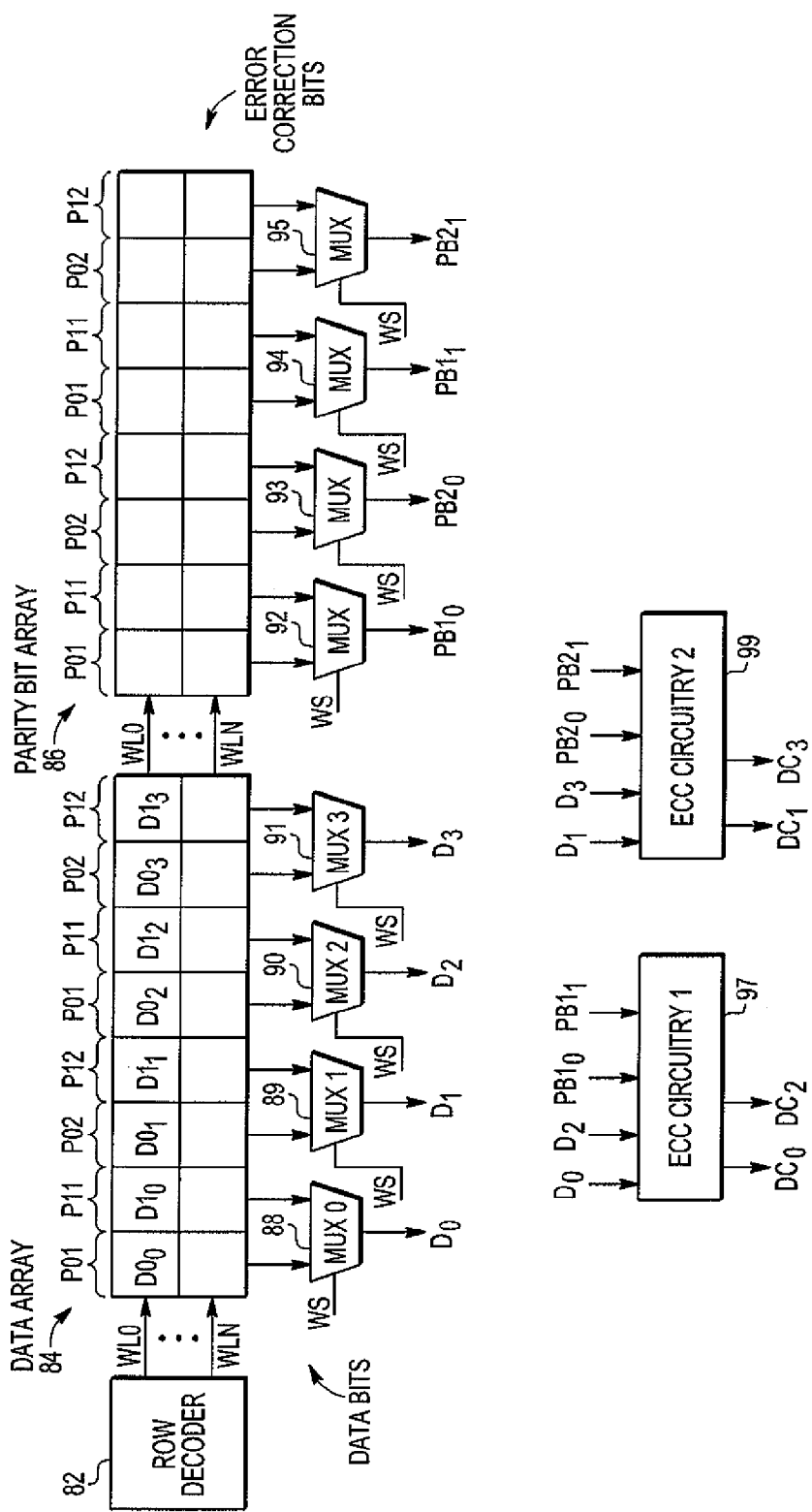
FIG. 8 illustrates in block diagram form another embodiment of an error detection and correction circuit in accordance with the present invention.

Illustrated in FIG. 8 is another form of a memory system 80 which uses way interleaving or data bits from two different data words, $D_0$ and $D_1$, in a single row of a memory array. Selection circuitry selects between a first data word or a second data word in response to a way select signal, WS. Error correction bits or parity bits are correlated with the data bits as explained herein. The memory system 80 generally has a row decoder 82, a data array 84 for storing data bits and a parity bit array for storing parity or error correction bits. The data array 84 has a plurality of rows and columns of data bits. There are N+1 rows or wordlines. Each wordline is addressed by a wordline signal, WL0 through WLN, respectively that is provided by the row decoder 82. Row decoder 82 has a respective wordline conductor connected to the data array 84. The data organization of a first wordline of the data array includes data bits from two data words, $D_0$ and $D_1$. The sequential bits of data word $D_0$ are $D0_0$, $D0_1$, $D0_2$ and $D0_3$. The sequential bits of data word $D_1$ are $D1_0$, $D1_1$, $D1_2$ and $D1_3$ to form an eight bit wordline, each data word having four bits. Other wordline bit lengths and data word sizes may be implemented. The bits of each data word are thus interleaved. Associated with data bit in the data array 84 is a parity bit subgroup pairing whose subgroup assignment is also interleaved. For example, data bit $D0_0$ (subgroup 0, first data bit 0) is assigned to the parity bit P01 (parity bit of subgroup 0, first parity bit 1). Data bit $D1_0$ (subgroup 1, first data bit 0) is assigned to the parity bit P11 (parity bit of subgroup 1, first parity bit 1). Data bit $D0_1$ (subgroup 0, second data bit 1) is assigned to the parity bit P02 (parity bit of subgroup 0, second parity bit 2). Within the wordline 0 of the parity bit array 86 are the sequential parity bits P01, P11, P02, P12, P01, P11, P02, P12 where the first number refers to the subgroup number and the second number refers to the bit position. For example, parity bit P01 is a parity bit for the 0 subgroup and is the first parity bit. Each of data bit array 84 and parity bit array 86 forms a plurality of columns. Each column is connected to a respective input of a multiplexor, such as multiplexors 88-95. Each of multiplexors 88-95 has a select input connected to a way select (WS) signal. Each of multiplexors 88-95 has an output for providing either a respective data bit or a respective parity bit. Multiplexors 88-91 each have an output for respectively providing data bits $D_0$, $D_1$, $D_2$ and $D_3$. For example, multiplexor 88 provides data bit 0 of either data word 0 or data word 1. Multiplexors 92-95 each have an output for respectively providing parity bits $PB1_0$, $PB2_0$, $PB1_1$ and $PB2_1$. For example, multiplexor 92 provides parity bit 0 of subgroup 1 ($PB1_0$) from either P01 or P11. Multiplexor 93 provides parity bit 0 of subgroup 2 ($PB2_0$). Multiplexor 94 provides parity bit 1 of subgroup 1 ($PB1_1$), and multiplexor 95 provides parity bit 1 of subgroup 2 ($PB2_1$).

It should be noted that in the event of a SER event occurring in the first wordline of the data array 84 that impacts three consecutive data bits, a correction of the three data bits may be made using a linear code such as the Hamming code. For example, assume that data bits $D0_0$, $D1_0$ and $D0_1$ are all damaged by an alpha particle and potentially have a programmed value reversed. While the bits $D0_0$ and $D0_1$ are consecutive bits 0 and 1 of the data word 0, a polynomial correction algorithm is not required to correct these two bits because each is assigned to a different subgroup of parity bits and thus become a single bit error for that subgroup. The differing parity bit subgrouping is possible as a result of the interleaving of assignment of parity groups for consecutive bits in a memory array wordline as illustrated in FIG. 8. In other words, the correction code bits are associated with logical partitions of a data word. No bits of a logical partition are physically adjacent. In the interleaving of parity bit subgroups in FIG. 8, there is a bit of a second subgroup of parity bits located between two consecutive bits of a first subgroup of parity bits.

Once the Data bits D0-D4 and respective parity bits $PB1_0$, $PB2_0$, $PB1_1$ and $PB2_1$ are provided, the bits are coupled to respective inputs of ECC circuitry for each subgroup of parity bits. Because the FIG. 8 implementation is illustrating two data words per wordline in which each data wordline is eight bits long, each data word is four bits. Therefore, only two subgroups of parity bits and two ECC circuits are required. ECC circuitry 97 has two inputs for respectively receiving two data bits, $D_0$ and $D_2$, and has two inputs for respectively receiving two parity bits $PB1_0$ and $PB1_1$. ECC circuitry 97 implements a linear correction code such as the ECC circuitry explained in FIGS. 2-6 and outputs correct data bits $DC_0$ and $DC_2$. ECC circuitry 99 has two inputs for respectively receiving two data bits, $D_1$ and $D_3$, and has two inputs for respectively receiving two parity bits $PB2_0$ and $PB2_1$. Similarly, ECC circuitry 99 implements a linear correction code such as the ECC circuitry explained in FIGS. 2-6 and outputs correct data bits $DC_1$ and $DC_3$. Thus, a linear correction code may be used in connection with a memory array of data bits read and written in an array where an SER event disturbs three consecutive bit positions in the array in any direction. Using the methods described herein any one of various linear correction codes may be used to implement multiple bit error correction codes.

By now it should be apparent that there has been provided a data storage array that positions data bits by partitioning the bits into residual subgroups or classes. All data bits whose position belongs to a subgroup are combined to do single bit error correction. The interleaving of subgroup assignment to the data bits in a memory array of rows and columns of data bits permits single error correction to be implemented even when alpha particles and other energy sources cause a multiple bit disturbance to the array.

In one form there is herein provided a method for performing error correction of data of a memory array including storage locations arranged in rows and columns. A group of data bits of a data unit is read from a row of storage locations of a memory array, wherein the group of data bits includes a first subgroup of data bits and a second subgroup of data bits. The first subgroup of data bits are stored in a first group of storage locations of the row and the second subgroup of data bits are stored in a second group of storage locations of the row. The first group of storage locations are located at interleaved positions in the row with respect to the second group of storage locations. A group of error correction bits are read, the group of error correction bits including a first subgroup of error correction bits and a second subgroup of error correction bits. A first error correction operation is performed by error correction circuitry using the first subgroup of error correction bits and the first subgroup of data bits to produce a first subgroup of correct data bits. A second error correction operation is performed by error correction circuitry using the second subgroup of error correction bits and the second subgroup of data bits to produce a second subgroup of correct data bits. A data unit of correct data bits is provided, wherein the data unit of correct data bits includes the first subgroup of correct data bits and the second subgroup of correct data bits. In one form performing the first error correction operation and the second error correction operation each include performing a linear error correction operation. In another form the first subgroup of correct data bits is located at interleaved positions with respect to the second subgroup of correct data bits in the unit of correct data bits. In another form the group of data bits includes a third subgroup of data bits. The third subgroup of data bits are stored in a third group of storage locations of the row. The first group of storage locations, the second group of storage locations, and the third group of storage locations are located at interleaved positions in the row with respect to each other. The group of error correction bits includes a third subgroup of error correction bits. The method includes performing a third error correction operation by error correction circuitry using the third subgroup of error correction bits and the third subgroup of data bits to produce a third subgroup of correct data bits. The unit of correct data bits includes the third subgroup of correct data bits. In another form the first subgroup of correct data bits, the second subgroup of correct data bits, and the third subgroup of correct data bits are located at interleaved positions with respect to each other in the unit of correct data bits. In yet another form the group of data bits includes a fourth subgroup of data bits. The fourth subgroup of data bits is stored in a fourth group of storage locations of the row. The first group of storage locations, the second group of storage locations, the third group of storage locations, and the fourth group of storage locations are located at interleaved positions in the row with respect to each other. The group of error correction bits includes a fourth subgroup of error correction bits. The method includes performing a fourth error correction operation by error correction circuitry using the fourth subgroup of error correction bits and the fourth subgroup of data bits to produce a fourth subgroup of correct data bits. The unit of correct data bits includes the fourth subgroup of correct data bits. The first subgroup of correct data bits, the second subgroup of correct data bits, the third subgroup of correct data bits, and the fourth subgroup of correct data bits are located at interleaved positions with respect to each other in the unit of correct data bits. In another form the first subgroup of error correction bits are stored in a third group of storage locations and the second subgroup of error correction bits are stored in a fourth group of storage locations. The third group of storage locations is located at interleaved positions in a row of storage locations with respect to the fourth group of storage locations. In another form the first subgroup of error correction bits are stored in a third group of storage locations of the row and the second subgroup of error correction bits are stored in a fourth group of storage locations of the row. The third group of storage locations is located at interleaved positions in the row with respect to the fourth group of storage locations. In another form if the first error correction operation or the second error correction operation detects an error, then a group of data bits of a second data unit in a second row of the memory array adjacent to the row is read in response to detecting the error. Error correction operations are performed on the group of data bits of the second data unit using error correction bits to generate a second data unit of correct data bits. In another form performing an error correction operation includes generating a syndrome from the first subgroup of data bits and the first subgroup of error correction bits. The syndrome is decoded to provide an indication, if existing, of an incorrect bit in the first subgroup of data bits. If an incorrect bit exists as determined by the decoding the syndrome, the incorrect bit in the first subgroup of data bits is changed, wherein the first subgroup of correct data bits includes the changed bit.

In another form there is herein provided a memory system having a memory array, the memory array including memory storage locations arranged in rows and columns. Reading circuitry is operably coupled to columns of the memory array and includes a group of outputs for providing data bits from the memory array. Error correction circuitry includes a first group of inputs operably coupled to a first subgroup of the group of outputs of the reading circuitry, a second group of inputs operably coupled to a second subgroup of the group of outputs of the reading circuitry, a third group of inputs for receiving error correction bits, and a fourth group of inputs for receiving error correction bits. The error correction circuitry includes a group of outputs to provide a data unit of correct data bits, wherein the group of outputs includes a first subgroup of outputs to provide a first subgroup of correct data bits of the data unit of correct data bits. The group of outputs includes a second subgroup of outputs to provide a second subgroup of correct data bits of the data unit of correct data bits, wherein the error correction circuitry generates the first subgroup of correct data bits by performing an error correction operation using bits from the first group of inputs and bits from the third group of inputs. The error correction circuitry generates the second subgroup of correct data bits by performing an error correction operation using bits from the second group of inputs and bits from the fourth group of inputs. Bits received from the first group of inputs are read from a first group of storage locations of a selected row of the memory array and bits received from the second group of inputs are read from a second group of storage locations of the selected row. The first group of storage locations is located at interleaved positions within the selected row with respect to the second group of storage locations. In another form the error correction circuitry generates the first subgroup of correct data bits by performing a linear error correction operation using bits from the first group of inputs and bits from the third group of inputs. In yet another form the error correction circuitry generates the second subgroup of correct data bits by performing a linear error correction operation using bits from the second group of inputs and bits from the fourth group of inputs. In yet another form the first subgroup of correct data bits is located at interleaved positions with respect to the second subgroup of correct data bits in the data unit of correct data bits. In another form the error correction circuitry includes a fifth group of inputs operably coupled to a third subgroup of outputs of the group of outputs of the reading circuitry. The error correction circuitry includes a sixth group of inputs for receiving error correction bits. The group of outputs of the error correction circuitry includes a third subgroup of outputs to provide a third subgroup of correct data bits of the unit of correct data bits. The error correction circuitry generates the third subgroup of correct data bits by performing an error correction operation using bits from the fifth group of inputs and bits from the sixth group of inputs. Bits received from the fifth group of inputs were read from a third group of storage locations of the selected row of the memory array. The first group of storage locations, the second group of storage locations, and the third group of storage locations are located at interleaved positions in the selected row with respect to each other. In another form the first subgroup of correct data bits, the second subgroup of correct data bits, and the third subgroup of correct data bits are located at interleaved positions with respect to each other in the unit of correct data bits. In another form the error correction circuitry includes a seventh group of inputs operably coupled to a fourth subgroup of outputs of the group of outputs of the reading circuitry. The error correction circuitry includes an eighth group of inputs for receiving error correction bits. The group of outputs of the error correction circuitry includes a fourth subgroup of outputs to provide a fourth subgroup of correct data bits of the unit of correct data bits. The error correction circuitry generates the fourth subgroup of correct data bits by performing an error correction operation using bits from the seventh group of inputs and bits from the eighth group of inputs. Bits received from the seventh group of inputs were read from a fourth group of storage locations of the selected row of the memory array. The first group of storage locations, the second group of storage locations, the third group of storage locations, and the fourth group of storage locations are located at interleaved positions in the selected row with respect to each other. In yet another form the error correction bits from the third group of inputs were received from a third group of storage locations and the error correction bits from the fourth group of inputs were received from a fourth group of storage locations. The third group of storage locations is located at interleaved positions with in a row of storage locations with respect to the fourth group of storage locations. In another form the error correction bits from the third group of inputs were received from a third group of storage locations of the selected row and the error correction bits from the fourth group of inputs were received from a fourth group of storage locations of the selected row. The third group of storage locations is located at interleaved positions in the selected row with respect to the fourth group of storage locations. In another form the error correction circuitry includes a syndrome generator for generating a syndrome from bits from the first group of inputs and bits from the third group of inputs. A decoder decodes the syndrome to provide an indication, if existing, of an incorrect bit in the bits from the first group of inputs. If an incorrect bit exists as determined by the decoder, the error correction circuitry changes the incorrect bit in the bits from the first group of inputs, wherein the first subgroup of correct data bits includes the changed bit. In another form the reading circuitry includes a plurality of multiplexors, each multiplexor of the plurality of multiplexors having at least two inputs where each input is operably coupled to a column of the memory array. Each multiplexor of the plurality of multiplexors has an output, each output of a first group of multiplexors of the plurality of multiplexors is operably coupled to an input of the first group of inputs. Each output of a second group of multiplexors of the plurality of multiplexors is operably coupled to an input of the second group of inputs.

Although the invention has been described with respect to specific conductivity types or polarity of potentials, skilled artisans appreciated that conductivity types and polarities of potentials may be reversed. Moreover, terms such as "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Although the invention is described herein with reference to specific embodiments, various modifications and changes can be made without departing from the scope of the present invention as set forth in the claims below. For example, the word line signals in FIGS. 2 and 8 may be implemented as a general select signal that controls a multiplexor circuit for selecting between a plurality of stored data bits and parity bits. In this form a memory array and row decoder may not be used. Rather, any type of storage device may be used to store the data bits and parity bits in the arrangement taught herein. Such storage device is coupled to a multiplexor which provides a predetermined data value and parity bit value in response to a select signal rather than a word line signal. Thus the term 'word line signal' should be broadly understood as meaning a 'select signal'.

Any of a variety of memory and data storage circuits may be used to implement the methods and circuitry described herein. Various bit cell circuits may be used to implement the memory array described herein. Various data lengths may be implemented. Additionally, while linear coding is described herein, other ECC bit groupings (e.g. a reduced polynomial code) may be implemented to obtain a savings in complexity and power. For example, instead of implementing four sets of single bit error correction, another embodiment may use two sets of two-bit error correction. In this form there is higher complexity than the single bit error correction but still significantly less complexity than a four-bit polynomial error correction.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A method for performing error correction of data of a memory array including storage locations arranged in rows and columns, the method comprising:

reading a group of data bits of a data unit from a row of storage locations of a memory array, wherein the group of data bits includes a first subgroup of data bits and a second subgroup of data bits, wherein the first subgroup of data bits are stored in a first group of storage locations of the row and the second subgroup of data bits are stored in a second group of storage locations of the row, wherein the first group of storage locations are located at interleaved positions in the row with respect to the second group of storage locations;

reading a group of error correction bits, the group of error correction bits including a first subgroup of error correction bits and a second subgroup of error correction bits;

performing a first error correction operation by error correction circuitry using the first subgroup of error correction bits and the first subgroup of data bits to produce a first subgroup of correct data bits;

performing a second error correction operation by error correction circuitry using the second subgroup of error correction bits and the second subgroup of data bits to produce a second subgroup of correct data bits; and providing a data unit of correct data bits, wherein the data unit of correct data bits includes the first subgroup of correct data bits and the second subgroup of correct data bits.

2. The method of claim 1 wherein the performing the first error correction operation and the second error correction operation each include performing a linear error correction operation.

3. The method of claim 1 wherein the first subgroup of correct data bits is located at interleaved positions with respect to the second subgroup of correct data bits in the data unit of correct data bits.

4. The method of claim 1 wherein:
the group of data bits includes a third subgroup of data bits;
the third subgroup of data bits are stored in a third group of storage locations of the row;
the first group of storage locations, the second group of storage locations, and the third group of storage locations are located at interleaved positions in the row with respect to each other;
the group of error correction bits includes a third subgroup of error correction bits;
the method includes performing a third error correction operation by error correction circuitry using the third subgroup of error correction bits and the third subgroup of data bits to produce a third subgroup of correct data bits; and
the data unit of correct data bits includes the third subgroup of correct data bits.

5. The method of claim 4 wherein the first subgroup of correct data bits, the second subgroup of correct data bits, and the third subgroup of correct data bits are located at interleaved positions with respect to each other in the data unit of correct data bits.

6. The method of claim 4 wherein:
the group of data bits includes a fourth subgroup of data bits;
the fourth subgroup of data bits are stored in a fourth group of storage locations of the row;
the first group of storage locations, the second group of storage locations, the third group of storage locations, and the fourth group of storage locations are located at interleaved positions in the row with respect to each other;
the group of error correction bits includes a fourth subgroup of error correction bits;
the method includes performing a fourth error correction operation by error correction circuitry using the fourth subgroup of error correction bits and the fourth subgroup of data bits to produce a fourth subgroup of correct data bits;
the data unit of correct data bits includes the fourth subgroup of correct data bits; and
the first subgroup of correct data bits, the second subgroup of correct data bits, the third subgroup of correct data bits, and the fourth subgroup of correct data bits are located at interleaved positions with respect to each other in the data unit of correct data bits.

7. The method of claim 1 wherein:
the first subgroup of error correction bits are stored in a third group of storage locations and the second subgroup of error correction bits are stored in a fourth group of storage locations; and
the third group of storage locations are located at interleaved positions in a row of storage locations with respect to the fourth group of storage locations.

8. The method of claim 1 wherein:
the first subgroup of error correction bits are stored in a third group of storage locations of the row and the second subgroup of error correction bits are stored in a fourth group of storage locations of the row; and
the third group of storage locations are located at interleaved positions in the row with respect to the fourth group of storage locations.

9. The method of claim 1 wherein performing the first error correction operation includes:
generating a syndrome from the first subgroup of data bits and the first subgroup of error correction bits;
decoding the syndrome to provide an indication, if existing, of an incorrect bit in the first subgroup of data bits; and
if an incorrect bit exists as determined by the decoding the syndrome, changing the incorrect bit in the first subgroup of data bits to provide a changed bit, wherein the first subgroup of correct data bits includes the changed bit.

10. The method of claim 1 wherein the performing the first error correction operation corrects the first subgroup of data bits to produce the first subgroup of correct data bits when an error is present in the first subgroup of data bits.

11. The method of claim 1 wherein the performing the first error correction operation produces the first subgroup of correct data bits unchanged from the first group of data bits when no error is present in the first subgroup of data bits.

12. A memory system comprising:
a memory array, the memory array including memory storage locations arranged in rows and columns;
reading circuitry coupled to columns of the memory array and including a group of outputs for providing data bits from the memory array; and
error correction circuitry including a first group of inputs coupled to a first subgroup of the group of outputs of the reading circuitry, a second group of inputs coupled to a second subgroup of the group of outputs of the reading circuitry, a third group of inputs for receiving error correction bits, and a fourth group of inputs for receiving error correction bits, wherein the error correction circuitry includes a group of outputs to provide a data unit of correct data bits, wherein the group of outputs includes a first subgroup of outputs to provide a first subgroup of correct data bits of the data unit of correct data bits, the group of outputs includes a second subgroup of outputs to provide a second subgroup of correct data bits of the data unit of correct data bits, wherein the error correction circuitry generates the first subgroup of correct data bits by performing an error correction operation using bits from the first group of inputs and bits from the third group of inputs, wherein the error correction circuitry generates the second subgroup of correct data bits by performing an error correction operation using bits from the second group of inputs and bits from the fourth group of inputs, wherein bits received from the first group of inputs were read from a first group of storage locations of a selected row of the memory array and bits received from the second group of inputs were read from a second group of storage locations of the selected row, wherein the first group of storage locations are located at interleaved positions within the selected row with respect to the second group of storage locations.

13. The memory system of claim 12 wherein:

the error correction circuitry generates the first subgroup of correct data bits by performing a linear error correction operation using bits from the first group of inputs and bits from the third group of inputs; and the error correction circuitry generates the second subgroup of correct data bits by performing a linear error correction operation using bits from the second group of inputs and bits from the fourth group of inputs.

14. The memory system of claim 12 wherein the first subgroup of correct data bits is located at interleaved positions with respect to the second subgroup of correct data bits in the data unit of correct data bits.

15. The memory system of claim 12 wherein:

the error correction circuitry includes a fifth group of inputs coupled to a third subgroup of outputs of the group of outputs of the reading circuitry;

the error correction circuitry includes a sixth group of inputs for receiving error correction bits;

the group of outputs of the error correction circuitry includes a third subgroup of outputs to provide a third subgroup of correct data bits of the data unit of correct data bits;

the error correction circuitry generates the third subgroup of correct data bits by performing an error correction operation using bits from the fifth group of inputs and bits from the sixth group of inputs;

bits received from the fifth group of inputs were read from a third group of storage locations of the selected row of the memory array; and the first group of storage locations, the second group of storage locations, and the third group of storage locations are located at interleaved positions in the selected row with respect to each other.

16. The memory system of claim 15 wherein the first subgroup of correct data bits, the second subgroup of correct data bits, and the third subgroup of correct data bits are located at interleaved positions with respect to each other in the data unit of correct data bits.

17. The memory system of claim 15 wherein:

the error correction circuitry includes a seventh group of inputs operably coupled to a fourth subgroup of outputs of the group of outputs of the reading circuitry;

the error correction circuitry includes a eighth group of inputs for receiving error correction bits;

the group of outputs of the error correction circuitry includes a fourth subgroup of outputs to provide a fourth subgroup of correct data bits of the data unit of correct data bits;

the error correction circuitry generates the fourth subgroup of correct data bits by performing an error correction operation using bits from the seventh group of inputs and bits from the eighth group of inputs;

bits received from the seventh group of inputs were read from a fourth group of storage locations of the selected row of the memory array; and the first group of storage locations, the second group of storage locations, the third group of storage locations, and the fourth group of storage locations are located at interleaved positions in the selected row with respect to each other.

18. The memory system of claim 12 wherein:

the error correction bits from the third group of inputs were received from a third group of storage locations and the error correction bits from the fourth group of inputs were received from a fourth group of storage locations; and the third group of storage locations are located at interleaved positions with in a row of storage locations with respect to the fourth group of storage locations.

19. The memory system of claim 12 wherein:

the error correction bits from the third group of inputs were received from a third group of storage locations of the selected row and the error correction bits from the fourth group of inputs were received from a fourth group of storage locations of the selected row; and the third group of storage locations are located at interleaved positions in the selected row with respect to the fourth group of storage locations.

20. The memory system of claim 12 wherein the error correction circuitry includes:

a syndrome generator for generating a syndrome from bits from the first group of inputs and bits from the third group of inputs;

a decoder for decoding the syndrome to provide an indication, if existing, of an incorrect bit within bits from the first group of inputs; and wherein if an incorrect bit exists as determined by the decoder, the error correction circuitry changes the incorrect bit in the bits from the first group of inputs, wherein the first subgroup of correct data bits includes the changed bit.

21. The memory system of claim 12 wherein the reading circuitry includes a plurality of multiplexors, each multiplexor of the plurality of multiplexors having at least two inputs where each input is coupled to a column of the memory array, each multiplexor of the plurality of multiplexors having an output, each output of a first group of multiplexors of the plurality of multiplexors is coupled to an input of the first group of inputs, each output of a second group of multiplexors of the plurality of multiplexors is operably coupled to an input of the second group of inputs.

* * * * *

UNITED STATES PATENT AND TRADEMARK OFFICE
CERTIFICATE OF CORRECTION

PATENT NO. : 8,365,036 B2
APPLICATION NO. : 12/560999
DATED : January 29, 2013
INVENTOR(S) : Ramaraju et al.

Page 1 of 1

It is certified that error appears in the above-identified patent and that said Letters Patent is hereby corrected as shown below:

In the Claims

In Column 15, Line 46 change "inputs operably coupled" to --inputs coupled--

Signed and Sealed this
First Day of October, 2013

Teresa Stanek Rea
*Deputy Director of the United States Patent and Trademark Office*